United States Patent [19]

Brezinski

[11] 3,994,213
[45] Nov. 30, 1976

[54] SANDWICH PREPARATION AND WARMING PAN

[76] Inventor: Adam Brezinski, 238 State St., Conneaut, Ohio 44030

[22] Filed: Apr. 9, 1975

[21] Appl. No.: 566,419

[52] U.S. Cl. .................................. 99/441; 99/449
[51] Int. Cl.² ........................................ A47J 43/18
[58] Field of Search ............ 99/448, 291, 298, 367, 99/374, 383–384, 416, 426–427, 441, 450, 450.4, 450.5; 211/13–14; 220/23.2, 23.8

[56] References Cited
UNITED STATES PATENTS

| | | | |
|---|---|---|---|
| 783,059 | 2/1905 | Miller | 220/23.8 X |
| 1,020,004 | 3/1912 | Wishman | 99/426 X |
| 1,168,819 | 1/1916 | Mildt | 220/23.2 X |
| 1,266,912 | 5/1918 | Bradbury | 99/441 |
| 2,044,615 | 6/1936 | Kennedy | 99/441 X |
| 2,647,454 | 8/1953 | Shelley | 99/441 |
| 2,741,901 | 4/1956 | Silos | 99/441 X |
| 3,517,606 | 6/1970 | Myles et al. | 99/450 |
| 3,807,057 | 4/1974 | Noel | 220/23.2 X |
| 3,915,309 | 10/1975 | Brazdo | 211/13 |

Primary Examiner—Edward L. Roberts
Assistant Examiner—Arthur O. Henderson
Attorney, Agent, or Firm—Ralph Hammar

[57] ABSTRACT

A pan for preparing hot submarine sandwiches and the like comprising a thin rectangular metal sheet with contiguous angular corrugations open at the tops and ends and each holding a single sandwich while it is being made up and also while it is being heated. The metal is so thin that it heats up and cools down very quickly so most of the heat goes into the sandwiches and the pan cools down and is ready for reuse very soon after the hot sandwiches have been unloaded.

6 Claims, 5 Drawing Figures

SANDWICH PREPARATION AND WARMING PAN

This invention is a pan for preparing hot submarine sandwiches and the like. The pan comprises a rectangular metal sheet with open ended contiguous angular corrugations, one for each sandwich, an underlying frame for holding the corrugations in fixed relation to each other and a handle for loading and unloading the pan from an oven. Each sandwich can be made up in its own corrugation and when the desired number of sandwiches are in the pan, the pan is loaded into an oven for heating.

Figure 1:
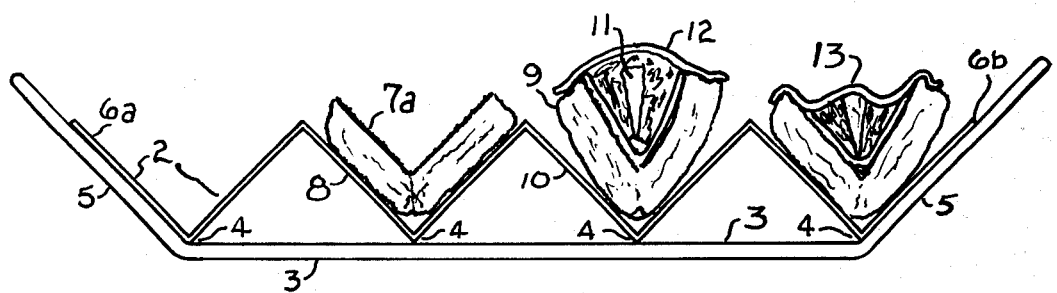
FIG. 1 is a side elevation of a preferred form of pan for four submarine sandwiches.
Figure 2:
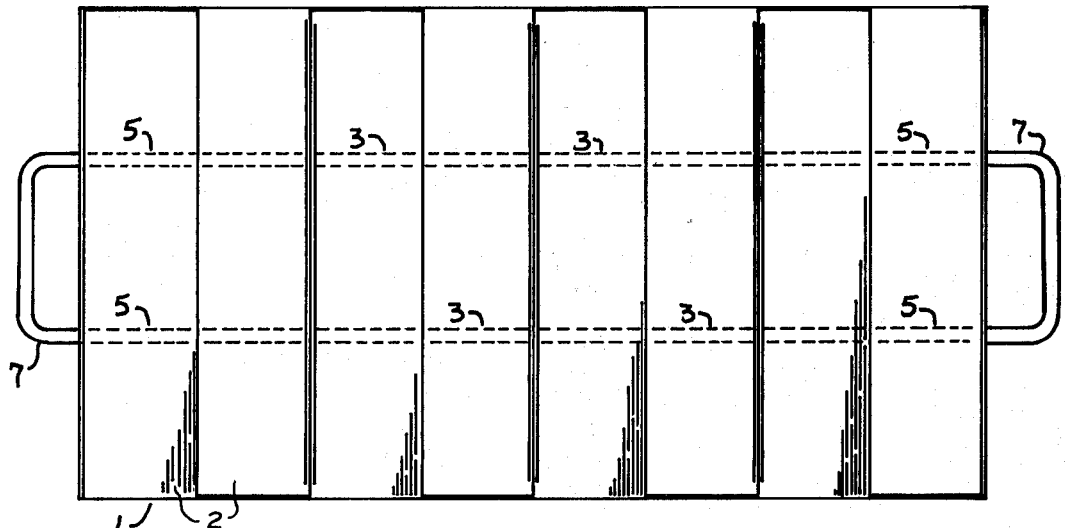
FIG. 2 is a top plan view.
Figure 3:
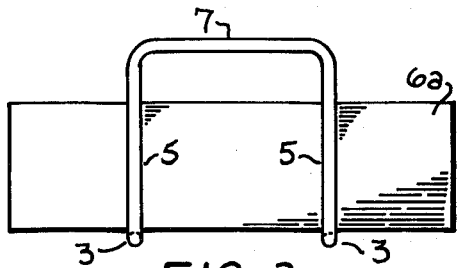
FIG. 3 is an end elevation.

The pan has a rectangular bottom 1 having any desired number of contiguous angular corrugations 2 extending widthwise across the bottom. The bottom is of thin sheet metal such as stainless steel which will heat up and cool down quickly. The corrugations are open at the top and at both ends and have a length substantially equal to the length of the sandwich to be eaten. The corrugations are held in fixed relation to each other by a frame comprising laterally spaced longitudinal wire runners 3 extending beneath and joined by spot welds to the apexes 4 of the corrugations. At opposite ends the runners have upwardly inclined sections 5 joined by spot welds to the outermost side of the end corrugations 6a, 6b. The uppermost ends of the inclined members 5 are joined by a bridging member 7 forming handles for the pan. There is a handle at each end of the pan but only one handle is used at a time. The extra handle makes the pan symetrical so it can be used in any orientation. The pan is of light weight construction which makes it easy to handle. Another advantage is that the pan heats up and cools down very quickly.

Figure 5:
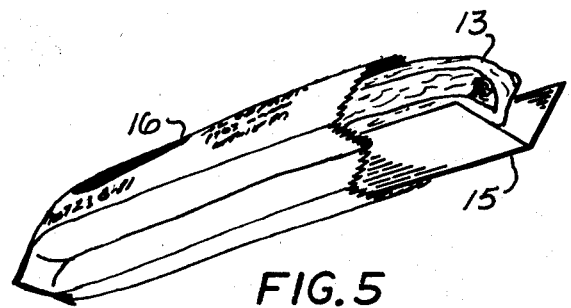
FIG. 5 is a perspective of a submarine sandwich being loaded into a bag.
Figure 4:
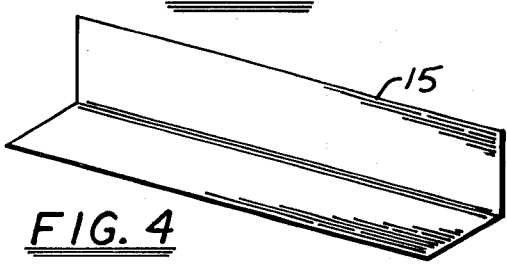
FIG. 4 is a perspective of the tool for scooping the hot sandwiches out of the pan.

The sandwiches are made up in the pan. 7a indicates a longitudinally slit submarine sandwich roll which has been spread open and laid into corrugation 8 with the slit facing upward. 9 indicates a roll in corrugation 10 which has been made up with a filling 11, topped with a slice 12 of cheese and pressed down into its corrugation. 13 indicates a sandwich in corrugation 6b which has been heated. In a typical pizza oven having a temperature of 500° to 600° F, a pan of sandwiches is heated about three to four minutes. After removal of the pan from the oven, the individual sandwiches are removed by a scoop consisting of an open ended stainless steel corrugation 15 of the same shape as the corrugations 2. The length of the unloading corrugation is such that no handle is necessary. The operator merely grasps one end of the corrugation and inserts the other end beneath the sandwich to scoop it out of the pan and then inserts the sandwich into a bag 16 as shown in FIG. 5.

Although the pan is close to oven temperature when it is removed from the oven and requires gloves for handling, a minute or so after unloading the pan has cooled down so it is ready for reloading with a fresh batch of sandwiches. This is due to the light weight construction which allows the metal parts to heat up and cool down rapidly. A fast heat up means that most of the heat goes into the sandwiches and is not wasted in heating up the pan. A fast cool down means that the pan may be used more efficiently.

Time is also saved because the pan is both a fixture for making up the sandwiches as well as a fixture for heating the sandwiches.

The particular pan shown was designed for a pizza shop. It could be made into a kitchen pan for homes.

The pan meets all sanitary regulations. The filling remains in the sandwiches during heating. Accidental spillage is easily cleaned up. Once a day washing is ordinarily sufficient.

The wire frame 3,5,7 and the welds maintain the shape of the corrugations even though the sheet metal 1 is very thin. The tying together of the apexes 4 by the runners 3, the fastening of the inclined sections 5 to the end corrugations 6a, 6b and the bridging members 7 all rigidify the pan.

The runners 3 receive heat by conduction from the supporting surface on which the runners rest and conduct heat to the apexes 4 of the corrugations. There is also heat transfer by conduction from the corrugations to the point of contact with the rolls. These points of contact do not locally over heat the rolls indicating that the heat is uniformly applied to all surfaces of the rolls.

If the frame 3,5,7 or its equivalent were omitted, comparable rigidity could be obtained only by greatly increasing the thickness of the metal, making the pan heavy, slow to heat up and slow to cool down, all of which are objectionable in hot sandwich preparation.

I claim:

1. Equipment for preparing hot submarine sandwiches and the like and for heating the same in a pizza oven having a temperature of about 500° to 600° F, consisting essentially of a rectangular sheet of thin metal having contiguous angular corrugations open at the tops and ends and with downwardly extending apexes, the metal being so thin that it heats up and cools down very quickly so most of the heat goes into the sandwiches and the pan cools down and is ready for reuse very soon after the hot sandwiches have been unloaded each corrugation being of width and length for holding a single slit sandwich roll spread open with the slit facing upward while the sandwich is being made up and also while it is being heated in a pizza oven or the like, and a frame extending crosswise beneath and fixed at laterally spaced points to the downwardly directed apexes of the corrugations and to the outermost sides of the end corrugations for maintaining the shape of the corrugations.

2. The equipment of claim 1 in which the frame has laterally spaced runners extending crosswise beneath and fixed to the apexes of the corrugations.

3. The equipment of claim 2 in which the runners extend and are fixed to the outside of the outermost sides of one of the end corrugations and are joined by a bridging member to form a handle for the pan.

4. The equipment of claim 3 in which there is a like handle at each end corrugation.

5. The pan of claim 1 in which the frame has a handle.

6. The equipment of claim 1 in combination with a scoop consisting essentially of a single open ended sheet metal corrugation of the same shape as said sheet metal corrugations, one end of which is inserted beneath each sandwich to scoop it out of its corrugation.

* * * * *